(12) United States Patent
Klym et al.

(10) Patent No.: US 11,797,573 B2
(45) Date of Patent: *Oct. 24, 2023

(54) DYNAMIC AND SELECTIVE OBJECT UPDATE FOR LOCAL STORAGE COPY BASED ON NETWORK CONNECTIVITY CHARACTERISTICS

(71) Applicant: Slack Technologies, Inc., San Francisco, CA (US)

(72) Inventors: Jason Klym, Brooklyn, NY (US); Mark Christian, Benicia, CA (US)

(73) Assignee: SALESFORCE, INC., San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/328,639

(22) Filed: May 24, 2021

(65) Prior Publication Data
US 2021/0279258 A1      Sep. 9, 2021

Related U.S. Application Data

(63) Continuation of application No. 16/201,870, filed on Nov. 27, 2018, now Pat. No. 11,016,993.

(51) Int. Cl.
*G06F 16/28* (2019.01)
*G06F 16/23* (2019.01)
(Continued)

(52) U.S. Cl.
CPC .......... *G06F 16/28* (2019.01); *G06F 16/2379* (2019.01); *H04L 67/146* (2013.01)

(58) Field of Classification Search
CPC ... G06F 16/28; G06F 16/2379; H04L 67/146; H04L 67/2842
(Continued)

(56) References Cited

U.S. PATENT DOCUMENTS

| 8,635,271 | B1 * | 1/2014 | Adya | H04L 67/5683 |
| | | | | 709/217 |
| 2008/0229025 | A1 * | 9/2008 | Plamondon | H04L 67/56 |
| | | | | 709/218 |

(Continued)

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Hares Jami
(74) *Attorney, Agent, or Firm* — ERISE IP, P.A.

(57) ABSTRACT

To reduce the amount of data traffic flowing between a remote computing platform and a client device, a manager for a data store of the client device is configured to observe upserts to the data store for one or more objects for a current connection session reflected therein; track fresh objects of a plurality of objects stored within the local data store, wherein fresh objects are identified as having an upsert during the current connection session; observe gets from the data store for one or more objects of the plurality of objects, and upon detecting a get for a particular object, determining whether the particular object is fresh, and if the object is detected to be stale, initiate an upsert from the remote computing platform to the data store for the particular object.

20 Claims, 5 Drawing Sheets

(51) Int. Cl.
  *H04L 67/14* (2022.01)
  *H04L 67/146* (2022.01)
(58) Field of Classification Search
  USPC .......................................... 707/620, 689, 690
  See application file for complete search history.

(56) References Cited

U.S. PATENT DOCUMENTS

| | | | | |
|---|---|---|---|---|
| 2008/0281973 A1* | 11/2008 | Yang | ...................... | H04L 61/59 709/227 |
| 2011/0218951 A1* | 9/2011 | Kline | ...................... | H04L 67/55 706/12 |
| 2012/0210310 A1* | 8/2012 | Cooley | ...................... | G06F 8/65 717/168 |
| 2014/0188803 A1* | 7/2014 | James | ................... | G06F 16/178 707/638 |
| 2018/0131660 A1* | 5/2018 | Lambert | ............ | G06Q 30/0202 |
| 2018/0287982 A1 | 10/2018 | Draeger et al. | | |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications—", FUJITSU Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c> (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

DYNAMIC AND SELECTIVE OBJECT UPDATE FOR LOCAL STORAGE COPY BASED ON NETWORK CONNECTIVITY CHARACTERISTICS

RELATED APPLICATIONS

This application is a continuation application, and claims priority benefit, with regard to all common subject matter, of earlier-filed U.S. patent application Ser. No. 16/201,870, filed Nov. 27, 2018, and entitled, "DYNAMIC AND SELECTIVE OBJECT UPDATE FOR LOCAL STORAGE COPY BASED ON NETWORK CONNECTIVITY CHARACTERISTICS." The above-referenced patent application is hereby incorporated by reference in its entirety into the present application.

BACKGROUND

Systems have been provided for disseminating published updates to objects among a plurality of client devices via an at least partially centralized messaging system.

Through applied effort, ingenuity, and innovation many deficiencies of such systems have been solved by developing solutions that are in accordance with the embodiments of the present invention, many examples of which are described in detail herein.

BRIEF SUMMARY

Various embodiments serve to decrease network traffic between a remote computing platform (such as a group-based communication platform or other centralized data distribution computing platform) and client devices based on an automatically determined need for object updates at each of the client devices. Rather than transmitting data indicative of object updates to client devices for all objects reflected on the client device, each client device has a manager for a local data store configured to monitor which objects are being used/retrieved from the data store, and to request update data from the remote computing platform for those objects determined to be in use by the client device. Thereafter, the remote computing platform automatically provides further updates regarding those objects, and the client device's manager of the data store automatically determines that those objects remain adequately updated.

The manager maintains a listing of objects determined to be adequately updated or "fresh" for a particular data connection with the remote computing platform. This listing may grow to include additional objects over the duration of a connection session between the remote computing platform and the client device. Once the connection session is terminated however, the manager clears this maintained listing of fresh objects, and restarts this listing when a new connection session is initiated.

Certain embodiments are directed to a manager for a data store embodied within a memory storage area of a client device. The manager may be configured to: observe upserts to the data store for one or more objects of a plurality of objects, wherein the upserts are received from a remote computing platform; track fresh objects of the plurality of objects for a current connection session, wherein the fresh objects are identified as having an upsert during the current connection session; observe gets from the data store for one or more objects of the plurality of objects, wherein the gets relate to one or more local processing instances of the client device; upon detecting a get for a particular object of the plurality of objects: determine whether the particular object is a fresh object; and upon determining that that the particular object is not a fresh object, initiate an upsert from the remote computing platform to the data store for the particular object.

In certain embodiments, each of the plurality of objects have a corresponding object identifier, and wherein tracking fresh objects comprises maintaining a session-specific indication of object identifiers corresponding with fresh objects for the current connection session. In various embodiments, the particular object has a corresponding particular object identifier; and determining whether the particular object is a fresh object may comprise comparing the particular object identifier corresponding with the particular object against the session-specific indication of object identifiers corresponding with fresh objects for the current connection session.

In various embodiments, tracking fresh objects comprises: tagging one or more objects of the plurality of objects with a connection session identifier indicative of a connection session during which a most recent upsert was received for a corresponding object of the one or more objects; and wherein fresh objects are tagged with a connection session identifier matching a current session identifier corresponding with the current connection session.

In other embodiments, tracking fresh objects comprises updating a binary fresh/stale indicator associated with one or more objects to reflect a fresh state.

Moreover, the manager of certain embodiments may be further configured to detect the initialization of a new connection session with the remote computing platform; and clear previously tracked fresh objects for a previous connection session. In certain embodiments, the manager may be further configured to detect the initialization of a new connection session with the remote computing platform; generate a new connection session identifier for the new connection session; and wherein, upon detecting a get for a particular object of the plurality of objects: determining whether the particular object is a fresh object may comprise comparing a connection session identifier tagged with the particular object against the new connection session identifier for the new connection session.

In certain embodiments, the manager is configured to, upon detecting a get for a particular object of the plurality of objects: before determining whether the particular object is a fresh object, provide the object to the one or more local processing instances.

In various embodiments, the manager is further configured to, upon detecting a get for a particular object of the plurality of objects, and upon determining that the particular object is not a fresh object: before initiating an upsert from the remote computing platform to the data store for the particular object, identify the particular object as a fresh object.

Certain embodiments are directed to a method for managing a data store embodied within a memory storage area of a client device. In various embodiments, the method comprises: observing upserts to the data store for one or more objects of a plurality of objects, wherein the upserts are received from a remote computing platform; tracking fresh objects of the plurality of objects for a current connection session, wherein the fresh objects are identified as having an upsert during the current connection session; observing gets from the data store for one or more objects of the plurality of objects, wherein the gets relate to one or more local processing instances of the client device; upon detecting a get for a particular object of the plurality of objects: determining whether the particular object is a fresh object; and upon determining that that the particular object is not a fresh object, initiating an upsert from the remote computing platform to the data store for to the particular object.

In various embodiments, each of the plurality of objects have a corresponding object identifier, and wherein tracking fresh objects comprises: maintaining a session-specific listing of object identifiers corresponding with fresh objects for the current connection session.

In certain embodiments, the particular object has a corresponding particular object identifier; and determining whether the particular object is a fresh object comprises: comparing the particular object identifier corresponding with the particular object against the session-specific listing of object identifiers corresponding with fresh objects for the current connection session. Moreover, tracking fresh objects may comprise: tagging one or more objects of the plurality of objects with a connection session identifier indicative of a connection session during which a most recent upsert was received for a corresponding object of the one or more objects; and wherein fresh objects are tagged with a connection session identifier matching a current session identifier corresponding with the current connection session.

In certain embodiments, tracking fresh objects comprises wherein tracking fresh objects comprises updating a binary fresh/stale indicator associated with one or more objects to reflect a fresh state.

In various embodiments, the method further comprises: detecting the initialization of a new connection session with the remote computing platform; and clearing previously tracked fresh objects for a previous connection session. Moreover, the method may comprise: detecting the initialization of a new connection session with the remote computing platform; generating a new connection session identifier for the new connection session; and wherein, upon detecting a get for a particular object of the plurality of objects: determining whether the particular object is a fresh object comprises comparing a connection session identifier tagged with the particular object against the new connection session identifier for the new connection session.

In certain embodiments, the method may further comprise, upon detecting a get for a particular object of the plurality of objects: before determining whether the particular object is a fresh object, providing the object to the one or more local processing instances.

Moreover, the method may further comprise, upon detecting a get for a particular object of the plurality of objects, and upon determining that the particular object is not a fresh object: before initiating an upsert from the remote computing platform to the data store for the particular object, identifying the particular object as a fresh object.

Certain embodiments are directed to a computer program product for managing a data store embodied within a memory storage area of a client device, the computer program product comprising at least one non-transitory computer-readable storage medium having computer-readable program code portions stored therein, the computer-readable program code portions comprising an executable portion configured to: observe upserts to the data store for one or more objects of a plurality of objects, wherein the upserts are received from a remote computing platform; track fresh objects of the plurality of objects for a current connection session, wherein the fresh objects are identified as having an upsert during the current connection session; observe gets from the data store for one or more objects of the plurality of objects, wherein the gets relate to one or more local processing instances of the client device; upon detecting a get for a particular object of the plurality of objects; determine whether the particular object is a fresh object; and upon determining that that the particular object is not a fresh object, initiating an upsert from the remote computing platform to the data store for the particular object.

In certain embodiments, each of the plurality of objects have a corresponding object identifier, and wherein tracking fresh objects comprises: maintaining a session-specific listing of object identifiers corresponding with fresh objects for the current connection session. In various embodiments, the particular object has a corresponding particular object identifier; and determining whether the particular object is a fresh object comprises: comparing the particular object identifier corresponding with the particular object against the session-specific listing of object identifiers corresponding with fresh objects for the current connection session.

In certain embodiments, tracking fresh objects comprises: tagging one or more objects of the plurality of objects with a connection session identifier indicative of a connection session during which a most recent upsert was received for a corresponding object of the one or more objects; and wherein fresh objects are tagged with a connection session identifier matching a current session identifier corresponding with the current connection session.

Moreover, tracking fresh objects may comprise updating a binary fresh/stale indicator associated with one or more objects to reflect a fresh state.

In certain embodiments, the computer program product further comprises an executable portion configured to: detect the initialization of a new connection session with the remote computing platform; and clear previously tracked fresh objects for a previous connection session. Moreover, the computer program product may further comprise an executable portion configured to: detect the initialization of a new connection session with the remote computing platform; generate a new connection session identifier for the new connection session; and wherein, upon detecting a get for a particular object of the plurality of objects: determining whether the particular object is a fresh object comprises comparing a connection session identifier tagged with the particular object against the new connection session identifier for the new connection session.

In certain embodiments, the computer program product further comprises an executable portion configured to, upon detecting a get for a particular object of the plurality of objects: before determining whether the particular object is a fresh object, provide the object to the one or more local processing instances.

Moreover, the computer program product may further comprise an executable portion configured to, upon detecting a get for a particular object of the plurality of objects, and upon determining that the particular object is not a fresh object: before initiating an upsert from the remote computing platform to the data store for the particular object, identify the particular object as a fresh object.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
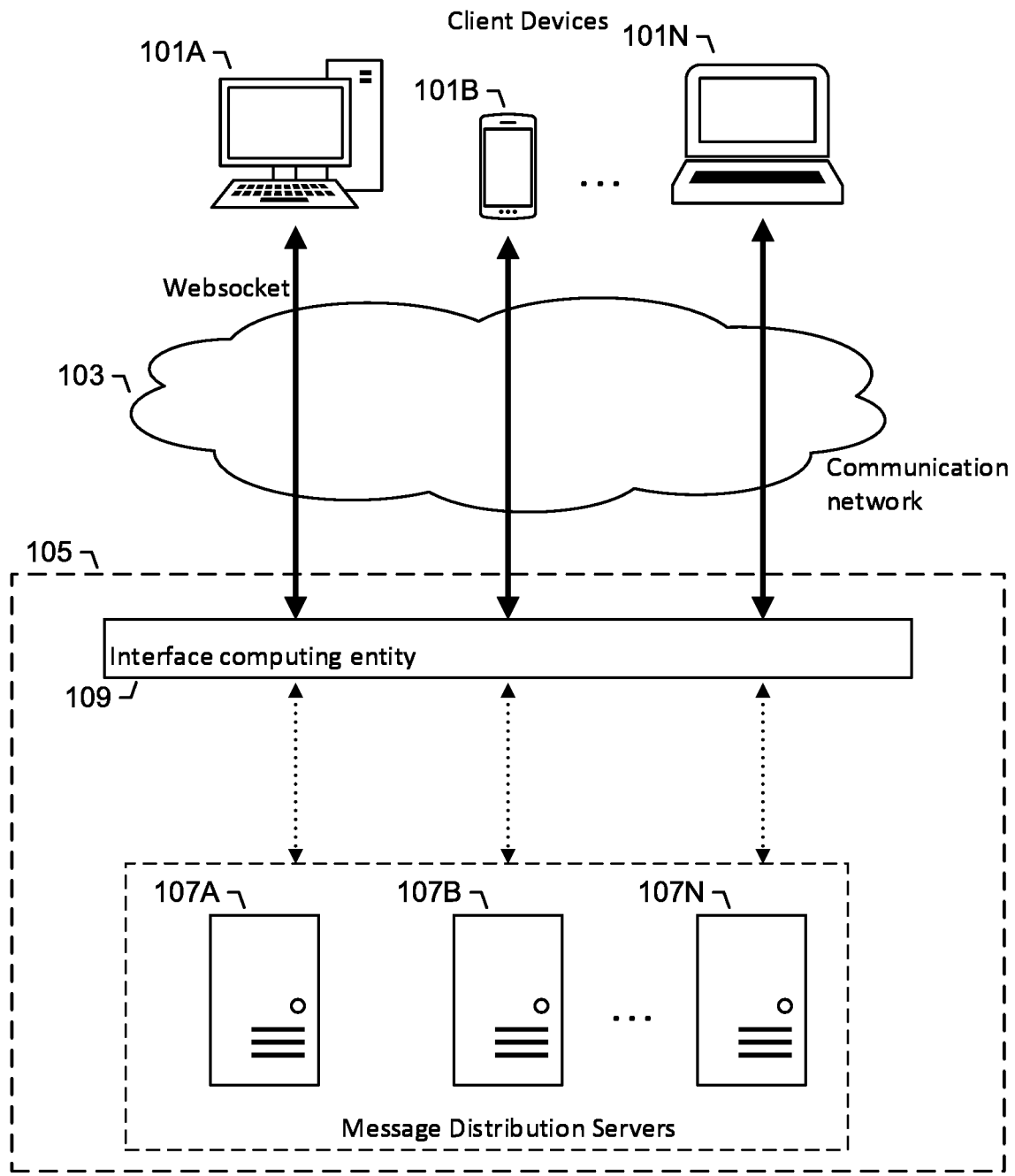
FIG. 1 shows a schematic view of a group-based communication platform in communication with client devices according to another embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In certain embodiments, client devices include data store managers executing thereon. These data store managers are configured to monitor the usage/retrieval of objects stored within the data store, as well as any upserts of new objects and/or object update data correlated with existing object updates to the data store. These objects may be utilized by one or more executable programs, or "apps" executing on the client device. For example, in a group-based communication platform, these objects may be reflective of other users' characteristics that a user of the client device may communicate with via the group-based communication platform. As yet another example, the objects may be reflective of files shared between users (e.g., documents, photos, sound files, and/or the like).

These objects, and their corresponding updates, may be received from a remote computing platform, such as a group-based communication platform. For example, as users share various objects, messages, and/or the like between multiple client devices via the group-based communication platform, corresponding objects may be provided to client devices to accurately reflect characteristics of the object, message, and/or the like shared between users. For example, objects (and/or object updates) may be provided to reflect the name of a user sending a message, whether the message was a response or reaction to another, existing message, and/or the like. As noted above, the objects themselves may be shared between users as well, in instances in which the objects are files (e.g., documents, photos, sound files, and/or the like) shared between users.

The manager operates to reduce the amount of data transmitted between the remote computing platform and a client device by identifying which objects reflected within a data store of the client device are to be updated, and when new data indicative of updates to those objects should be upserted to the data store. At a high level, the manager distinguishes between objects that are not in use by a corresponding app executing on the client device from objects which are currently in use by a corresponding app executing on the client device. This distinction enables the manager to request object updates for those objects that are currently in use, while enabling the data store to hold potentially stale or non-updated copies of objects that are not currently in use by apps executing on the client device. Thus, the amount of data transfer from the remote computing platform to the client device may be reduced, since only a subset of all objects stored within the client device's data store are updated.

To ensure that objects currently in use remain accurately updated, the manager monitors usage of various objects over the course of duration of a particular communication session with the remote computing platform. Thus, during a period of time in which the client device and remote computing platform maintain an active communication connection for data exchange therebetween, the manager monitors which objects are in use and which objects have been updated (or for which a check has been performed to determine whether an object stored at the client device's local data store is currently up-to-date) over the course of the current communication session. Once the client device disconnects from the remote computing platform (thereby terminating the current communication session and transitioning the communication session into a prior communication session), the manager resets the monitoring of object usage and updates, such that a new monitoring session may be initiated for a subsequent communication session (thereafter referred to as the current communication session while it is active).

To manage the data transfer from the remote computing platform to the client device for storage within the data store, the manager monitors "gets" (data retrieval actions for usage of objects by apps on the client device) and "upserts" (processes by which objects are added or updated within the data store) occurring during a communication session. Detected upserts for a particular object occurring during a communication session cause the manager to mark the particular object as fresh. Detected gets for particular objects cause the manager to request upserts from the remote computing platform for those particular objects, and to cause the manager to mark those particular objects as fresh for the remainder of the current connection session. Marking an object as fresh may comprise updating a connection session identifier associated with the locally-stored object data within the data store to match a current connection session identifier; updating a binary fresh/stale indicator to indicate that the object is fresh; and/or the like. Objects not upserted and/or not utilized via a get during a connection session are identified as "stale" to reflect the fact that locally stored copies of those objects within the data store may be out of sync (and un-updated) relative to objects at the remote computing platform. Identifying objects as stale may comprise an entirely passive process (e.g., the connection session identifier stored with the local object data at the local data store may not be updated to reflect the current connection session identifier, such that the connection session identifier matches a prior connection session identifier) or an active process (e.g., a binary fresh/stale indicator may be changed to indicate the object is stale).

Once the connection session terminates, the manager can no longer assume that any objects stored within the data store are fresh, and accordingly all objects stored within the data store may then be identified as stale during a subsequent connection session until an upsert is received for an object, or a get is initiated for an object, at which time the object is marked as fresh for the remainder of that subsequent connection session.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system (e.g., a computing platform, such as a group-based communication platform), in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

To access the services of a computing platform, the client device and/or computing platform establish a network connection therebetween embodied as an individual connection session. These connection sessions are temporally bounded by a time of initiation of the connection session (when a network connection is successfully established between the client device and the computing platform) and a time of termination of the connection session (when the network connection is terminated between the client device and computing platform). Thus, a single client device may utilize a plurality of connection sessions with a computing platform for data transfer over a period of time. As discussed herein, data relevant to a particular client device (e.g., updates for particular objects) may continue to be generated by (or provided to) the computing platform between connection sessions (while the client device is disconnected from the computing platform), and such data may be provided to the client device during a subsequent connection session.

The connection sessions may be characterized by a connection session identifier, which may be tracked/maintained by the client device. In certain embodiments, the connection session identifier may be a simple, incrementally increasing value reflecting the total number of connection sessions formed between the computing platform and the client device. For example, a first-ever connection session between the computing platform and the client device may have a corresponding connection session identifier of "1" (with or without leading zeros). A second-ever connection session between the computing platform and the client device may have a corresponding connection session identifier of "2;" and so on. As discussed herein, the connection session identifier for a current connection session (a currently ongoing connection session) may be stored locally on the client device, and accordingly the client device may be configured to increment the locally stored connection session identifier for the current connection session upon detecting the initiation of a new connection session. It should be understood that connection session identifiers may be embodied via any of a variety of identifiers, such as random numbers or alphanumeric strings, hash values, and/or the like.

The term "group-based communication platform" refers to a computing platform embodied as a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like.

The term "communication channel" refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users.

Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

Figure 4:
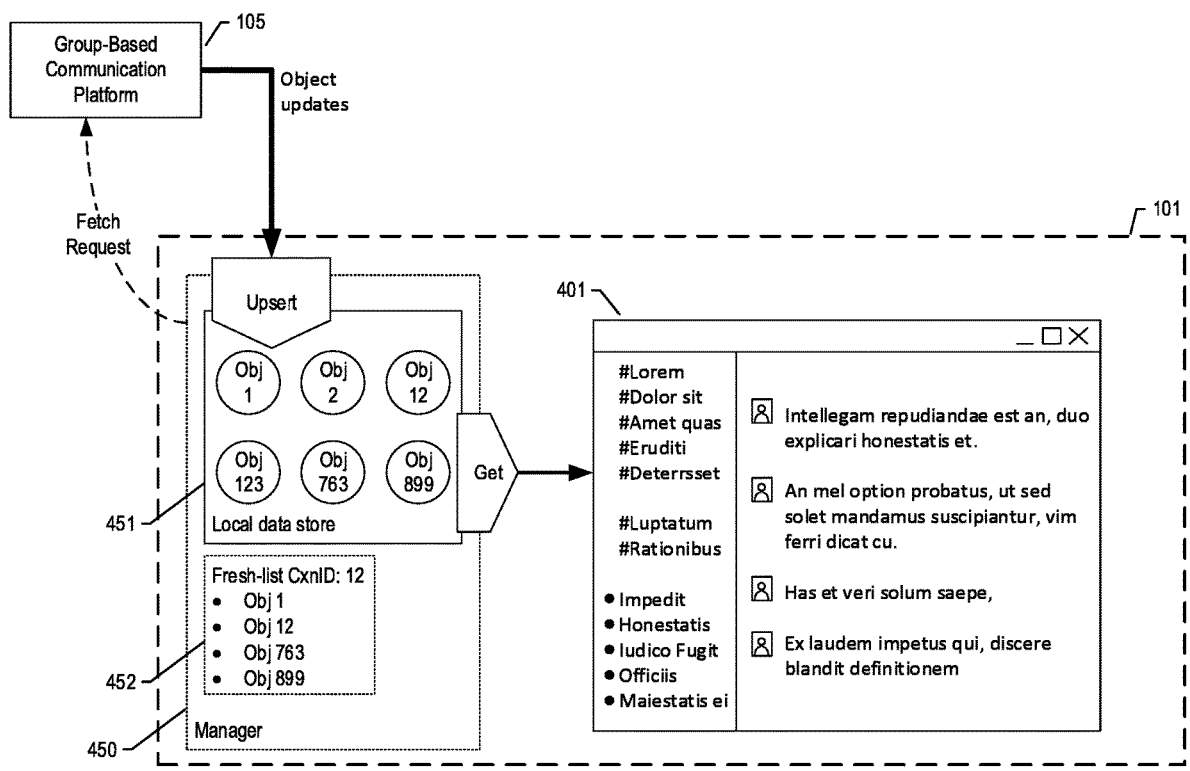
FIG. 4 shows a schematic view of data transmission interactions between display windows of a group-based communication interface, according to one embodiment.

In certain embodiments, the group-based communication channel interface may comprise multiple visible panes within a display window, as shown in FIG. 4, for example. In certain embodiments, each display pane may be configured to display specific data types. For example, a left-most pane may provide a listing of channels and/or direct messages available to a user and a right-most (or center pane, in a 3-pane configuration) may display the content of a particular channel in which messages are exchanged, including displaying all of those displayed messages. The content of the center pane may be presented as a scrollable feed in certain embodiments. In embodiments in which the main display window comprises 3-panes, the right-most pane may comprise additional data regarding a particular selected message, channel, and/or the like.

As used herein, the terms "messaging communication" and "message" refer to any electronically generated digital content object provided by a user using a client device and that is configured for display within a group-based communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication system includes metadata comprising the following: a sending user identifier, a message identifier, message contents, an object identifier, a group identifier and/or a group-based communication channel identifier. Each of the foregoing identifiers may comprise ASCII text, a pointer, a memory address, and the like. Messages may be generated and/or edited within an individual pane of a group-based communication interface (a single pane being visible within a particular display window) and/or messages may be generated and/or edited within separate display windows (e.g., separate display windows may be utilized for generating postings to be shared within a communication channel and/or for initiating a call with other users).

The term "object" as used herein may refer to any content source for which updates may be provided and disseminated to one or more client devices. A particular user may be considered an object to other users, such that updates regarding the characteristics and/or activities of the particular user may be disseminated to other client devices. Objects may also be embodied as files in certain embodiments, such that updates to those files may be disseminated to individual client devices. Updates relating to particular objects may be disseminated from the group-based communication platform to individual client devices as messages, which may comprise additional metadata identifying a particular object (referred to herein as an object identifier) to which the updates relate. These object identifiers enable a client device to display the update in association with the appropriate object and/or store the update in association with the appropriate object within a local data store on the client device. In certain embodiments, the object identifiers comprise data indicative of the type of object to which the object relates (e.g., a user object, a file object, and/or the like) and may additionally or alternatively comprise data indicative of a unique string (e.g., a unique number, a unique alphanumeric string, and/or the like) that uniquely identifies the object (e.g., among all of objects or among all objects of a particular object type).

Object updates may be provided to client devices through an "upsert" process, in which objects stored locally within a local data store on the client device (e.g., locally stored copies of objects reflected on the computing platform) are updated by replacing and/or supplementing data stored within the local data store of the client device with new data reflective of the object updates received from a computing platform, such as the group-based communication platform. In embodiments in which the objects are reflected by one or more individual rows within a relational database, the upsert process may be embodied as replacing one or more existing rows within the data store, adding one or more new rows within the data store (e.g., to reflect entirely new objects not previously reflected within the data store), to replace one or more portions of an existing row, and/or the like. As yet another example, in embodiments in which the objects are reflected by nodes and/or edges within a graphical database, the upserting process may be embodied as replacing one or more existing nodes or edges within the data store, adding one or more new nodes or edges within the data store (e.g., to reflect entirely new objects not previously reflected within the data store), and/or the like.

Objects may be "fresh" for a period of time after an upsert process is complete for a particular object. Specifically, objects are considered fresh during a continuous time period during which a connection session is maintained between a client device and a remote computing platform (such as a group-based communication platform) and the objects have been updated during the same connection session (or a check has been performed to determine whether an update is necessary during the same connection session). Because of the continuous connection between the remote computing platform and the client device, any later-in-time updates for the objects may be provided to the client device for storage in the local data store (e.g., in real-time), and therefore objects updated during a connection session may be assumed to be continuously fresh during that same connection session—either because additional updates have been provided to the client device during the same connection session, or by assuming that, if no additional updates have been provided during the connection session, there have been no applicable updates generated relating to the objects during the connection session. Those fresh objects are stored at the local data store of the client device, and are fully updated, such that the objects stored at the local data store of the client device match objects stored at the remote computing platform (e.g., group-based communication platform).

By contrast, objects stored locally at the local data store of the client device may also be "stale." Stale objects as discussed herein are those objects that cannot be assumed to be fresh, because a most-recent update for these stale objects (or a most-recent check to determine whether updates are necessary) did not occur during a current connection session. Because of the possibility that additional updates for the objects occurred while the remote computing platform (e.g., group-based communication platform) was not in communication connection with the client device (and therefore data reflecting the update may not have been transmitted to the client device), these objects cannot simply be assumed to reflect the most-current object characteristics as stored at the remote computing platform. In certain instances, stale objects stored at the client device may match a prior iteration (and older, out-of-date version) of the objects stored at the remote computing platform (e.g., the group-based communication platform). However, stale objects may, in certain circumstances, match the most current-iteration of a particular object if no updates were generated for the objects while the remote computing platform and the client device were disconnected. Even in the latter circumstances, the remote computing platform may be incapable of recognizing that these objects reflect most-recent object updates, and therefore the objects are marked as stale until a check is made to determine that the objects are updated.

In certain embodiments, objects may be stored in a local data store with metadata indicative of whether the object is fresh or stale. Such data may comprise a connection session identifier indicative of the connection session during which the object was last considered fresh (which may be compared against a current connection session identifier to determine whether the object is currently fresh or stale); and/or a fresh/stale marking (which may be a binary marker indicating whether the object is currently fresh or stale).

The locally stored objects within the data store may be utilized by one or more applications, computer programs, or other local processing instances executing on the client device. These local processing instances may comprise one or more graphical user interfaces for displaying objects, one or more executable programs configured for intaking objects as input, and/or the like. The locally stored objects may be retrieved from the local data store via a "get" process in which the objects are retrieved from the local data store and passed to one or more local processing instances.

The terms "group identifier" or "team identifier" refer to one or more items of data by which a group within a group-based communication system may be identified. For example, a group identifier may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like. In certain embodiments, a communication channel (whether public or private) may be available for use between users (and their associated client devices) of a common group/team, although cross-group communication channels may be available between client devices associated with users of separate teams. Thus, a channel identifier may be provided together with one or more group identifiers to specifically identify where data/ messages related to the particular communication channel are stored.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join and/ or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Interface computing entities" as discussed herein with reference to various embodiments are computing devices (or portions of computing devices) for maintaining connection sessions with various client devices. Specifically, interface computing entities may be configured for maintaining web socket connections initiated by each of a plurality of client devices for transmitting messages (e.g., object updates) and corresponding metadata (e.g., comprising object identifiers) in real time between message distribution servers of the group-based communication platform and respective client devices. The interface computing entities may thereby act as an object manager and interact with client devices for disseminating object updates among client devices both within and outside of the group-based communication platform. In certain embodiments, the interface computing entities generate and maintain backend connections with one or more message distribution servers as discussed herein for obtaining messages (e.g., object updates) to be disseminated to the various client devices.

"Message distribution servers" as discussed herein with reference to certain embodiments are computing devices configured for interacting with various client devices (e.g., via an interface computing entity) for receiving and/or disseminating object updates and/or other messages among client devices. Message distribution servers may be configured to receive, generate, store (in an associated database), and/or direct messages received from and/or disseminated to users (e.g., via corresponding client devices). The functionality of the message distribution servers may be provided via a single server or collection of servers having a common functionality, or the functionality of the message distribution servers may be segmented among a plurality of servers or collections of servers performing subsets of the described functionality of the message distribution servers. For example, a first subset of message distribution servers—gateway servers—may be configured for receiving messages from client devices and/or for transmitting messages to client devices via an interface computing entity. These gateway servers may be in communication with a second subset of message distribution servers—channel servers—configured for collecting messages distributed within communication channels and for storing those messages within a message repository database for indexing and archiving. In certain embodiments, the channel servers may be in communication with the interface computing entities to provide various messages to client devices.

In certain embodiments, one or more of the interface computing entities and/or the message distribution servers may be geographically distributed, for example, to service client devices located geographically proximate the one or more computing entities. However, in certain embodiments the various computing entities (including the interface computing entities and/or the message distribution servers) may be centrally-located.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates example computing systems within which embodiments of the present invention may operate. Users may access a group-based communication platform 105 via a communication network 103 using client devices 101A-101N.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 105 includes a plurality of message distribution servers 107A-107N accessible via the communication network 103 via an interface computing entity 109. Collectively, the message distribution servers 107A-107N are configured for receiving messages transmitted from one or more client devices 101A-101N, generating and/or receiving messages indicative of object updates (if applicable), for transmitting messages to appropriate client devices 101A-101N via an interface computing entity 109, and/or the like.

Similarly, the interface computing entity 109 (or plurality of interface computing entities 109) may be embodied as a computer or computers as known in the art. In the illustrated embodiment of FIG. 1, the interface computing entity 109 provides for receiving electronic data from various sources, including, but not limited to the client devices 101A-101N (e.g., via websocket communications over the communications network 103) and/or the message distribution servers 107A-107N (e.g., via backend communications). Moreover, the interface computing entity 109 of the illustrated embodiment is also configured to parse metadata provided as a portion of one or more electronic messages, and to direct incoming electronic messages to one or more message distribution servers 107A-107N based at least in part on the content of the metadata associated with the electronic messages and/or to direct outbound electronic messages to one or more client devices 101A-101N based at least in part on the content of the metadata associated with the electronic messages.

The client devices 101A-101N may be any computing device as defined above. Electronic message data exchanged between the message distribution servers 107A-107N and the client devices 101A-101N via the interface computing entity 109 may be provided in various forms and via various methods.

In some preferred and non-limiting embodiments, one or more of the client devices 101A-101N are mobile devices, such as smartphones or tablets. The one or more client devices may execute an "app" or other executable local processing instance to interact with the message distribution servers 107A-107N and/or interface computing entity 109. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 101A-101N, these client devices 101A-101N are configured for communicating with the group-based communication platform 105 via one or more websockets.

In some preferred and non-limiting embodiments, the client devices 101A-101N may interact with the message distribution servers 107A-107N and/or interface computing entity 109 via a web browser. The client devices 101A-101N may also include various hardware or firmware designed to interact with the message distribution servers 107A-107N and/or interface computing entity 109. Again, via the browser of the client devices 101A-101N, the client devices 101A-101N are configured for communicating with the group-based communication platform 105 via one or more websockets.

In some embodiments of an exemplary group-based communication platform 105, a message or messaging communication may be sent from a client device 101A-101N to a group-based communication platform 105. In various implementations, messages may be sent to the group-based communication platform 105 over communication network 103 directly by one of the client devices 101A-101N. The messages may be sent to the group-based communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertificate.dc</digital_cert_link>
            //OPTIONAL <digital_certificate>_DATA _< /digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
Apple WebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
```

```
</client_details>
<client_details> //iOS Client with Webbrowser
   <client_IP>10.0.0.123</client_IP>
   <user_agent_string>Mozilla/5.0 (iPhone; CPU iPhone OS 7_1_1 like Mac OS X)
Apple WebKit/537.51.2 (KHTML, like Gecko) Version/7.0 Mobile/11D201
Safari/9537.53</user_agent_string>
   <client_product_type>iPhone6,1</client_product_type>
   <client_serial_number>DNXXX1X1XXXX</client_serial_number>
   <client_UDID>3XXXXXXXXXXXXXXXXXXXXXXXXD</client_UDID>
   <client_OS>iOS</client_OS>
   <client_OS_version>7.1.1</client_OS_version>
   <client_app_type>web browser</client_app_type>
   <client _name>Mobile Safari</client_name>
   <client_version>9537.53</client_version>
</client_details>
<client_details> //Android Client with Webbrowser
   <client IP>10.0.0.123</client_IP>
   <user_agent_string>Mozilla/5.0 (Linux; U; Android 4.0.4; en-us; Nexus S
Build/IMM76D) Apple WebKit/534.30 (KHTML, like Gecko) Version/4.0 Mobile
Safari/534.30</user_agent_string>
   <client_product_type>Nexus S</client_product_type>
   <client_serial_number>YXXXXXXXXZ</client_serial number>
   <client_UDID>FXXXXXXXXX-XXXX-XXXX-XXXXXXXXXXXX</client_UDID>
   <client_OS>Android</client_OS>
   <client_OS_version>4.0.4</client_OS_version>
   <client_app_type>web browser</client_app_type>
   <client_name>Mobile Safari</client_name>
   <client_version>534.30</client_version>
</client_details>
<client_details> //Mac Desktop with Webbrowser
   <client_IP>10.0.0.123</client_IP>
   <user_agent_string>Mozilla/5.0 (Macintosh; Intel Mac OS X 10_9_3)
Apple WebKit/537.75.14 (KHTML, like Gecko) Version/7.0.3
Safari/537.75.14</user_agent_string>
   <client_product_type>MacPro5,1</client_product_type>
   <client_serial_number>YXXXXXXXXZ</client_serial_number>
   <client_UDID>FXXXXXXXXX-XXXX-XXXX-XXXX-
XXXXXXXXXXXX</client_UDID>
   <client_OS>Mac OS X</client_OS>
   <client_OS_version>10.9.3</client_OS_version>
   <client_app_type>web browser</client_app_type>
   <client_name>Mobile Safari</client_name>
   <client_version>537.75.14</client_version>
</client_details>
<message>
   <message_identifier>ID_message_10</message_identifier>
   <team_identifier>ID_team_1</team_identifier>
   <channel_identifier>ID_channel_1</channel_identifier>
   <contents>That is an interesting invention. I have attached a copy our patent
policy.< /contents>
   <attachments>patent_policy.pdf</attachments>
</message>
</auth_request>
```

In the illustrated embodiment, the group-based communication platform 105 comprises a plurality of message distribution servers 107A-107N configured to receive and/or disseminate messages transmitted between and/or to a plurality of client devices 101A-101N within a channel identified by a channel identifier and/or a group identifier, and to facilitate dissemination of those messages among client devices 101A-101N that collectively form the membership of the communication channel.

In some embodiments, an object identifier as defined above may be associated with the message to indicate that a particular message is embodied as an object update relating to a particular object.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message, and these files may be separately identified as objects having a corresponding object identifier in certain embodiments. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the message distribution servers 107). Metadata associated with the message may be determined and the message may be indexed in the message distribution servers 107A-107N. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the message distribution servers 107A-107N to facilitate searching. In one embodiment, the files may be indexed such that a company's or a group's files are indexed at a separate distributed repository.

Examples of electronic information exchange among one or more client devices 101A-101N and the group-based communication platform 105 are described below with reference to FIG. 1.

As shown in FIG. 1, the group-based communication platform 105 enables individual client devices 101A-101N to exchange various messages with one another and/or to retrieve object updates disseminated from the group-based communication platform 105. To exchange such messages, individual client devices 101A-101N transmit messages (e.g., text-based messages, files, video and/or audio streams, and/or the like) to an interface (e.g., interface computing entity 109) via a communication protocol (e.g., via a websocket, a non-RTM (non-Real Time Messaging) messaging protocol, and/or the like). Those messages are ultimately provided to one or more message distribution servers 107A-107N, which indexes the messages and distributes those messages to the intended recipients (e.g., client devices 101A-101N) of the message. Object updates are similarly provided to the message distribution servers 107A-107N, however such object updates may not originate from client devices 101A-101N. Instead, object updates may be provided from one or more external systems (e.g., file management systems) or the object updates may be generated by one or more computing entities within the group-based communication platform 105. The distributed messages are provided to the recipient client devices 101A-101N via the interface computing entity 109, which maintains websocket connections with individual recipient client devices 101A-101N of the message, and maintains one or more backend connections with the various message distribution servers 107A-107N.

According to the embodiment of FIG. 1, the client devices 101A-101N are configured to display the received message in contextually-relevant user interfaces available to the user of the client device 101A-101N. For example, messages transmitted from a first client device 101 as a part of a group-based communication channel are displayed in a user interface display window on client devices 101A-101N associated with other members of the group-based communication channel. As discussed herein, messages indicative of particular object updates are transmitted with object identifiers usable by the recipient client devices 101A-101N to display those messages with appropriate context, such as appropriate user display elements and/or in association with applicable objects. Moreover, the object identifiers may be usable by various ones of the message distribution servers 107A-107N to filter messages destined for particular client devices 101A-101N based on object subscriptions as discussed herein.

To distribute messages to individual client devices 101A-101N, the messages are transmitted from the message distribution servers 107A-107N to the interface computing entity 109, which directs all messages destined for respective ones of the client devices 101A-101N, and transmits all of those messages to the client devices 101A-101N over appropriate connections (e.g., websocket connections).

Example Apparatuses Utilized with Various Embodiments

Figure 2:
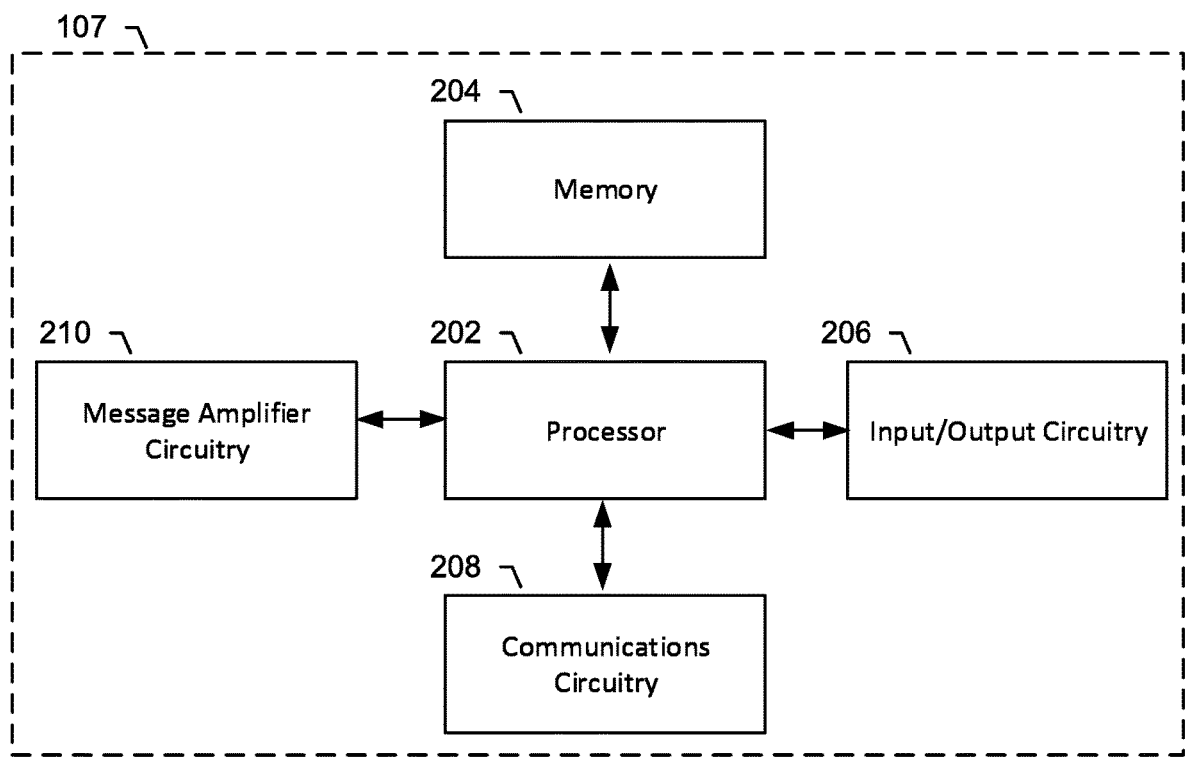
FIG. 2 shows a schematic view of a message distribution server according to one embodiment.

Each message distribution server 107 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described herein with respect to FIGS. 1-5. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N to enable message sharing/dissemination therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages to the interface computing entity 109 for dissemination to client devices 101A-101N.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 101A-101N to other client devices 101A-101N based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
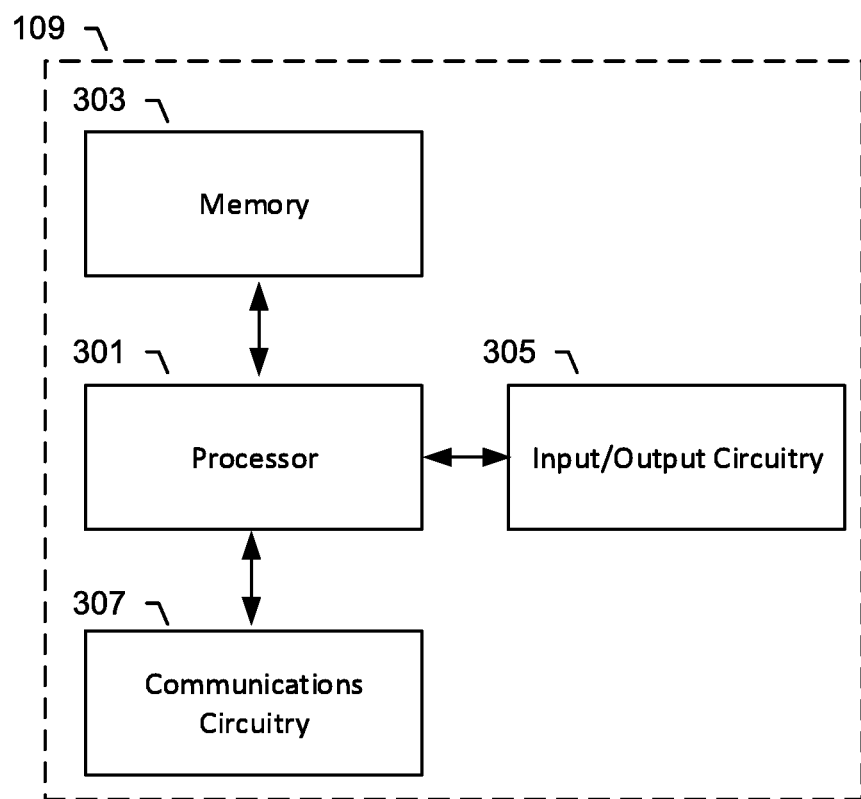
FIG. 3 shows a schematic view of an interface computing entity according to one embodiment.

In the illustrated embodiment of FIG. 3, the interface computing entity 109 is embodied by one or more computing systems encompassing apparatus 300. The illustrated apparatus 300 includes processor 301, memory 303, input/output circuitry 305, and communications circuitry 307. The apparatus 300 may be configured to execute the operations described herein with respect to FIGS. 1-5. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention. For example, the memory 303 may be configured to cache messages exchanged on one or more group-based communication channels, such that the processor 301 may provide various messages to client devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Moreover, although the interface computing entity 109 is shown within the bounds of the group-based communication platform 105, it should be understood that the interface computing entity 109 may be embodied as an edge-based computing device in communication with aspects of the group-based communication platform 105 via a communication network 103. Such embodiments may comprise a plurality of interface computing entities 109 that are geographically distributed, and such interface computing entities 109 may be configured for communicating with client devices 101A-101N within a geographic range proximate a respective interface computing entity 109.

The term "circuitry" should be understood broadly to include hardware and, in some embodiments, software for configuring the hardware. With respect to components of each apparatus 200, 300, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows

Figure 5:
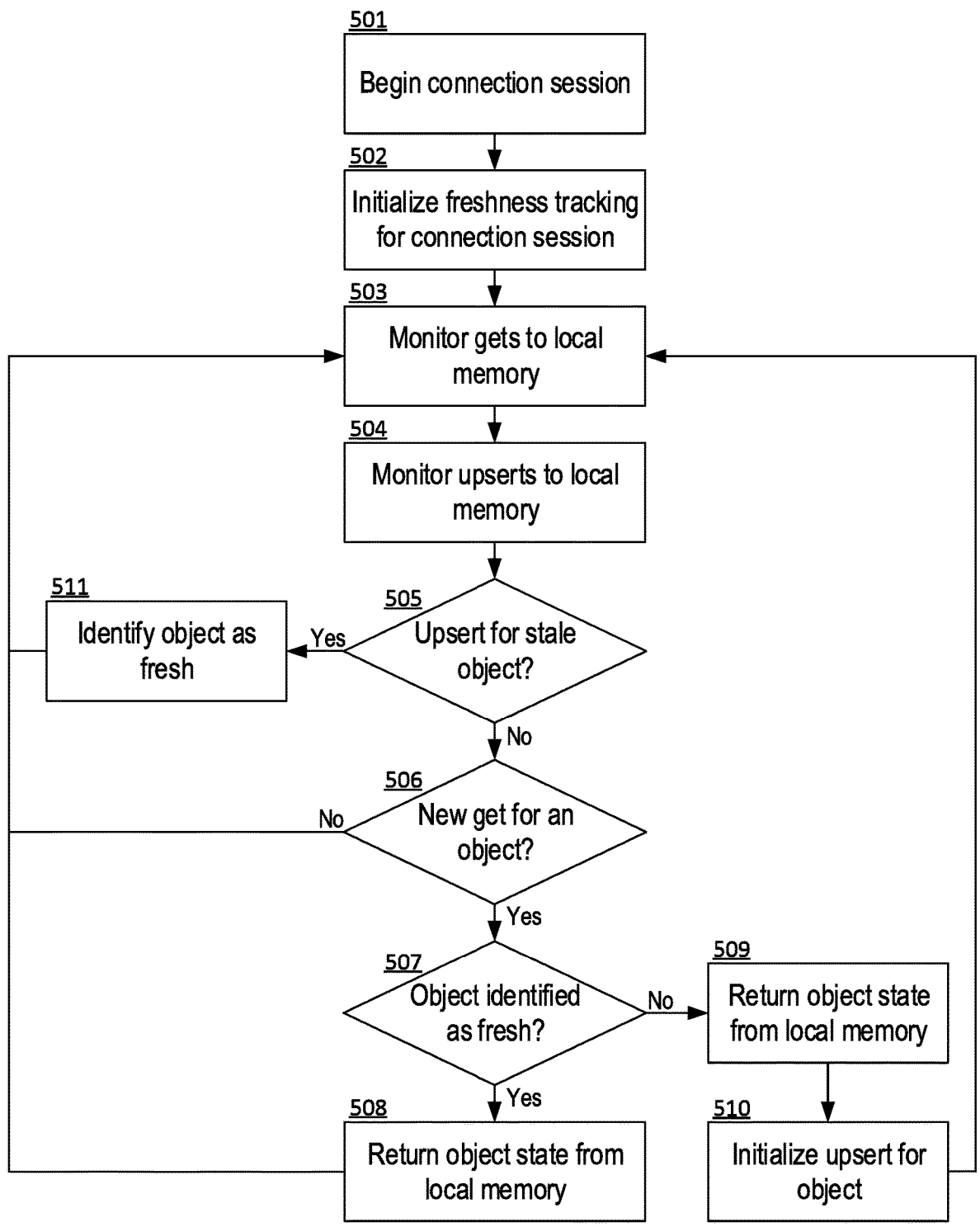
FIG. 5 is a flowchart illustrating the functionality of various computing entities according to various embodiments.

FIG. 5 is a flowchart illustrating the functionality of a client device 101A-101N (specifically a manager 450 of a local data store 451 of the client device 101A-101N) and a remote computing platform, such as a group-based communication platform 105. The functionality of these components as demonstrated in FIG. 5 is schematically depicted in FIG. 4. As discussed herein, various embodiments enable the remote computing platform (e.g., group-based communication platform 105) to minimize the amount of data transmitted to the client devices 101A-101N over communication connections (e.g., websocket connections) through the use of conditional interactions between the manager 450 of the client device's local data store 451 and the remote computing platform 105. These conditional interactions are governed by user interactions with the client device 101A-101N, such that manager 450 requests object update data from the remote computing platform 105 only for those objects actually in use (e.g., objects reflected within a graphical interface 401 of an app executing on the client device 101A-101N), and those objects are indicated as fresh (as reflected in the fresh-list 452 for an example connection session identifier of FIG. 4) during the connection session (e.g., by updating metadata associated with the object to reflect that the object was updated during the current connection session). The remaining objects are identified as stale to the manager 450 and remain stale unless and until a get is detected for the remaining objects during the connection session. For example, those stale objects may have associated metadata indicating that the objects were last updated during a prior connection session with the remote computing platform (e.g., the group-based communication platform 105).

With reference to the embodiment reflected in FIG. 5, an example configuration is described and illustrated for a client device 101 having a local data store 451 with a corresponding manager 450. In the illustrated embodiment, the operation of the manager 450 initializes when the client device 101 connects with a remote computing platform, such as a group-based communication platform, for data transfer therebetween, as indicated at Block 501. This established connection session may be a first connection between the computing devices, or the data connection for initializing operation of the manager 450 of the data store 451 may be a specific data connection for transmitting object updates from the remote computing platform to the client device 101. In the latter embodiments, other data connections may be established between the client device 101 and the remote computing platform prior to the connection session indicated at Block 501.

As indicated at Block 502, the manager 450 of the data store 451 initializes a freshness tracking session corresponding to the connection session. The initialization of the freshness tracking session may comprise steps for clearing any data corresponding to a prior freshness tracking session, such as data identifying particular objects as freshly updated during a prior connection session. As a specific example, a prior stored list or other indication of objects denoted as freshly updated may be cleared to restart the list or other indication for the recently initialized—and now current—connection session. In certain embodiments, this prior stored list or other indication of fresh objects may be cleared upon initialization of a new connection session between the client device and the remote computing platform, or upon the occurrence of another trigger event. As another example, this indication of fresh objects for a particular connection session (e.g., the fresh-list 452 of FIG. 4) may be cleared during a subsequent connection session, in response to receipt of a first upsert of object update data occurring during a subsequent connection session.

In certain embodiments, clearing a list or other indication of fresh objects (e.g., fresh-list 452) may comprise steps for updating a fresh/stale indicator associated with objects to reflect that those objects are stale for the now-current connection session. When clearing this indication of object freshness, the fresh/stale indicator for all objects stored within the data store 451 may be updated to reflect that those objects are stale for the now-current connection session. As upserts are then received for various objects, the fresh/stale indicator for those objects may be changed again to reflect that those objects are fresh for the current connection session. In accordance with this configuration, objects indicated as fresh (e.g., via a fresh/stale indicator applicable to the object) during a particular connection session may maintain the fresh indication after the termination of the particular connection session, and until the occurrence of a subsequent trigger event, such as the initiation of a subsequent connection session or the initiation of an upsert occurring during the subsequent connection session.

Certain embodiments may utilize connection session identifiers to distinguish between current and previous connection sessions. The connection session identifier may be determined by the client device 101 (e.g., by the data store manager 450) and may be stored locally thereon. In certain embodiments, the client device 101 need not provide the connection session identifier to the remote computing platform, and instead the client device 101 may utilize the connection session identifier locally. In certain embodiments, the connection session identifier may be an incrementally increasing number to reflect the number of separate connection sessions initialized between the client device 101 and the remote computing platform. Thus, the first connection session may have a corresponding connection session identifier of "1" (with or without leading zeros). This initial connection session identifier may be automatically assigned based on programmed code executing for operation of the data store manager 450. Subsequent connection session identifiers may be determined by incrementally increasing the connection session identifier corresponding to the most recent prior connection session. For example, the second connection session may have a corresponding connection session identifier of "2" (by incrementally increasing the prior connection session identifier of "1," by 1).

In certain embodiments, the connection session identifiers may be increased for a particular client device upon the occurrence of a trigger event corresponding to the termination of a connection session. In certain embodiments, a connection session may be terminated upon any interruption in the connection session between the client device 101 and the remote computing platform. In other embodiments however, a connection session may not be considered terminated unless and until the connection session remains terminated for at least a predefined period of time. For example, the remote computing platform may be configured to maintain a buffer for a defined period of time of any object updates occurring after a client device disconnects from the remote computing platform (e.g., 5 minutes). If the client device reconnects prior to the expiration of the defined period of time, the remote computing platform provides all buffered object updates to the client device as if the client device did not disconnect. In certain embodiments, the buffered object update data may be accessible via a defined URL (e.g., a temporary URL available for the defined period of time) such that a client device reconnecting using the defined URL and during the defined period of time receives the buffered object update data in accordance with the management configurations discussed herein.

The connection session identifier may be utilized to identify a connection session during which a particular object was last updated. As discussed in greater detail herein, upon receipt of upserts to provide update data relating to particular objects, the manager 450 may, according to certain embodiments, assign a connection session identifier corresponding to the current connection session to the upsert data, thereby marking the upsert data and the corresponding object with an indication of the most recent connection session during which the object was updated. In instances in which the data store 451 already stores data indicative of a prior connection session identifier in association with the object, the manager 450 causes the prior connection session identifier associated with the object to be replaced with the current connection session identifier to reflect the most-current update for the object. In certain embodiments, the manager 450 may additionally or alternatively update a fresh/stale identifier corresponding to the object data stored within the data store 451 to indicate that the upserted object is now considered fresh for the remainder of the connection session. In some embodiments, upon updating a fresh/stale identifier for a particular object that is upserted during the current connection session, the manager 450 may further be configured to update fresh/stale identifiers for other, non-upserted objects to indicate that those other objects are "stale" for the current connection session, at least until an upsert is received for those objects.

With reference again to Block 502, initializing freshness tracking for the connection session may thus comprise updating the current connection session identifier, such that upserts received during the current connection session are marked with the current connection session identifier (e.g., by storing the connection session identifier in metadata associated with the object in the data store 451) and/or changing a fresh/stale indicator associated with all objects within the data store 451 to reflect a stale indication. Thus, the manager 450 may distinguish between freshly updated objects from stale objects by comparing the connection session identifier associated with a particular object with the current connection session identifier corresponding to the current connection session. Additionally or alternatively, the manager 450 may distinguish between freshly updated objects and stale objects based on the fresh/stale indicator associated with each object. When initializing a freshness tracking session, none of the objects within the data store 451 have an associated connection session identifier associated with the current connection session. Thus, each time a new connection session is initialized between the client device 101 and the remote computing entity, the manager 450 of the data store 451 effectively starts with a newly cleared indication of freshly updated objects.

As indicated at Blocks 503 and 504, the manager 450 of the data store 451 monitors data store 451 access by the client device 101 (e.g., by apps executing on the client device) as well as data upserts to the data store 451 (e.g., regarding updates to previously identified objects and/or identifications of new objects not previously reflected within the data store 451). Specifically, the manager 450 monitors gets at the data store 451, reflective of usage of various objects (e.g., users, user groups, teams, messages, files, threads, channels, bots, apps, and/or the like) by one or more executable apps operating on the client device. As reflected in the illustration of FIG. 4, these gets represent local data usage of various objects. For example, to display a visual representation of the object within a graphical display of an app. As a non-limiting example of a group-based communication interface getting a user object corresponding with a first user, the group-based communication interface may get the user object of the first user for display via a graphical display upon the user of the corresponding client device 101 selecting a graphical display configuration in which the first user is reflected therein (e.g., selecting a particular group-based communication channel in which the first user has recently transmitted a message, which would thus be displayed within the selected graphical interface). As additional examples, third party apps (computer programs) executable at least in part via an interface utilizing objects from the data store 451 may be configured to generate get requests (e.g., to generate data via the one or more third party apps (which may be executable at least in part via third party computing entities) and/or to review data access permissions for one or more apps). As yet other examples, bots (or other artificial intelligence based systems executable at least in part on the remote computing platform and/or the one or more client devices) may access data from the data store 451 via one or more get processes as discussed herein.

Moreover, the manager 450 monitors upserts, as reflected at Block 504 (and as graphically illustrated in FIG. 4). These upserts may comprise updates to one or more objects stored within the data store 451 of the client device 101, and/or the upserts may comprise new data reflective of new objects to be stored within the data store 451. In certain embodiments, these upserts may reflect newly changed characteristics associated with a particular object. As a specific example, an upsert corresponding to a user object of a group-based communication platform may reflect a newly updated display name to be associated with the user. Specifically, if a particular user object had an associated display name of "Betty Sue," and was subsequently updated to be "Betsy," subsequent display of data relating to the particular user object will be correlated with the display name "Betsy" as a result of the update. As yet another non-limiting example, timestamp data indicative of when a most-recent upload, message, and/or other action occurred may be updated via upsert processes as discussed herein (e.g., a time stamp associated with a particular may be updated from "Last update 11/12/2018 at 11:12:15 PM" to "Last update 11/13/2018 at 10:43:22 AM" via the upsert process discussed herein).

As mentioned above, the manager 450 may be further configured to associate the current connection session identifier with any upserts received during the current connection session, thereby marking objects corresponding with newly received upserts as fresh. Such marking enables the manager 450 to distinguish between fresh objects (for which an upsert was received during the current connection session) and stale objects (for which an upsert was not received during the current connection session) when either gets or upserts are received for particular objects. Additionally or alternatively, the manager 450 may update a fresh/stale indicator associated with the object for which an upsert is received to indicate that the object is fresh during the current connection session.

As indicated at Block 505, the manager 450 determines whether an upsert is received for a stale object. As mentioned above, the first upsert received during a particular communication session will apply to a stale object, because no objects are marked as fresh immediately following the initialization of a new communication connection session between the client device 101 and the remote computing platform. However, when an upsert is received, the manager 450 is configured to determine whether the upsert applies to a stale object by first identifying the object to which the upsert applies. The manager 450 thus utilizes identifying data associated with the upsert, such as an object identifier associated with the upsert, to query the data store 451 to identify a corresponding object stored therein. The manager 450 then identifies a connection session identifier associated with the stored object within the data store 451, and compares the connection session identifier retrieved from the data store 451 against the current connection session identifier. Upon determining that the connection session identifier stored in association with the object within the data store 451 matches the current connection session identifier, the manager 450 determines that the object has been updated during the current connection session, and accordingly determines that the object is fresh. By contrast, upon determining that the connection session identifier stored in association with the object does not match the current connection session identifier, the manager 450 is configured to determine that the object is stale. If there are no objects reflected within the data store 451 corresponding to the upsert, the upsert is providing an entirely new object to the data store 451. As a part of the described process flow, these new objects are treated as stale objects for the manager 450, such that the manager 450 may appropriately mark these objects with the current connection session identifier when accepting the upsert.

Upon determining that the received upsert is for a fresh object, the upsert is accepted into the data store 451 to update the object without any changes and/or additions applied by the manager 450. This flow is reflected by the continuing process flow through Block 506 (following the "No" indication) and back to Block 503, reflecting that the manager 450 continues monitoring for gets and upserts to the data store 451. Thus, upserts received for already determined fresh objects maintain a current and up-to-date status of object data for those fresh objects during a current connection session. Upserts for fresh objects may be received in real-time and without prompting by the client device 101 (specifically, without prompting by the manager 450) during a communication session.

As discussed later in the process (particularly with respect to Blocks 509-510) upserts for stale objects may only be received at the client device 101 in response to a fetch request for an upsert transmitted from the client device 101 to the remote computing platform (and only after the remote computing platform determines that the client device is storing an out-of-date version of the object. Thus, upon receipt of an upsert for a stale object during monitoring as reflected at Block 504, the manager 450 determines whether the upsert corresponds to a stale object within the data store 451 as reflect at Block 505 (e.g., by comparing the communication session identifier associated with the object within the data store 451 with the current communication session identifier). If the manager 450 determines that the upsert corresponds to a stale object (e.g., the communication session identifier associated with the object within the data store 451 does not match the current communication session identifier), the process proceeds to Block 511, where the object is marked as fresh and the upsert is accepted to update the data corresponding to the object. Specifically, to mark the object as fresh, the manager 450 may update the communication session identifier associated with the object to match the current communication session identifier. Thereafter, the manager 450 will determine that the object is fresh during subsequent object upserts during the same communication session, and those subsequent upserts will be handled as discussed above.

If, during the monitoring processes reflected in Blocks 503-504 of FIG. 5, the manager 450 detects a new get for an object from the data store 451 (as reflected at Block 506), the manager 450 determines whether the object identified in the get is identified as fresh for the current communication connection session, as indicated at Block 507. Like the determinations of freshness relating to an upsert, the manager 450 determines whether a particular object identified in a get is fresh by querying the data store 451 to identify an object corresponding with the get. In certain embodiments, the get may identify an object based on an object identifier, and accordingly the manager 450 may retrieve the object from the data store 451 based at least in part on the object identifier reflected in the get. The manager 450 may then compare the connection session identifier stored in association with the object within the data store 451 against the current communication connection session identifier. Upon determining that the connection session identifier stored in association with the object within the data store 451 matches the current communication connection session identifier, the manager 450 determines that object identified in the get is fresh. As indicated at Block 508, the object state for the determined-fresh object is returned in response to the get request from the local data store 451 for use by the requesting app. It should be understood that returning the object state may be a "pull" process, in which the app pulls the object state from the data store 451. However in certain embodiments, returning the object state may be a "push" process in which the manager 450 pushes the object state from the data store 451 to the app. As reflected in FIG. 5, the manager 450 continues monitoring for gets and upserts as reflected at Blocks 503-504.

Upon determining the object is not fresh (e.g., upon determining that the object is stale) at Block 507, the process proceeds to steps reflected in Blocks 509-510. The processes associated with Blocks 509-510 are illustrated in an example order of operation, although it should be understood that in alternative embodiments, other orders of accomplishing the various steps are possible.

The process of complying with a get request relating to a stale object may begin as reflected at Block 509, in which the object state for the determined-stale object is returned in response to the get request from the local data store 451 for use by the requesting app. As discussed above in reference to fresh objects, the object state may be returned via either a pull process or a push process. By providing the object state prior to initializing any steps for updating the stored data, the process ensures a minimal likelihood of failure with respect to the get request. Thereby enabling the requesting app to continue proper functionality, even though initially the object data utilized may be out of date (however, as discussed herein, it should be understood that a "stale" object may not necessarily be out of date, if no updates were generated at the remote computing entity for the object in the interim since the last update was stored at the local data store 451).

Continuing the process for processing a get related to a stale object, the manager 450 requests/initializes an upsert for the object by generating a fetch request, as indicated at Block 510. As a part of requesting/initializing an upsert for the object, the manager 450 may populate a listing of objects to be fetched during a subsequent fetch request (e.g., the listing including object identifiers relating to those objects for which a fetch request is to be generated). By utilizing a listing of objects to be fetched, the manager 450 may be configured to avoid potentially generating duplicative fetch requests for an object in the event of an error state. This listing of objects to be fetched is dynamically updated as new objects to be fetched are identified and/or as fetch requests are generated and sent to the remote computing platform. In the latter instance, objects for which a fetch request has been generated and transmitted are removed from the listing of objects to be fetched, thereby avoiding potential duplicative fetch requests. Ultimately, as discussed herein, once objects updates are received after a fetch request for a stale object, the object is marked as fresh (e.g., by updating a communication connection session identifier associated with the stored object in the data store 451 to match the current communication connection session identifier and/or by updating a fresh/stale identifier to denote the object as fresh). However, it should be understood that in other embodiments, objects may be marked as fresh prior to requesting/initializing an upsert to further minimize the likelihood of generating an error as a result of two close-in-time get requests that may result in separate, duplicative upsert initiations for the same object.

The manager 450 generates a fetch request to be transmitted to the remote computing platform (as illustrated in FIG. 4). The fetch request may identify the object for which an upsert is requested (e.g., the fetch request may include the object identifier). In certain embodiments, the fetch request may further identify data indicative of the last update reflected in the local data storage area for the object. The latter data may be usable in instances in which upserts are configured for partial changes to objects, and/or otherwise in instances in which all historical upserts are required for the object to ensure the object is entirely updated within the local data store 451. For example, the fetch request may identify the connection session identifier stored with the object in the local data storage area (in embodiments in which the remote computing platform monitors the connection session identifier associated with particular client devices 101A-101N). Other embodiments may utilize time and/or date stamps associated with the object to identify when a last upsert was received for the object, which may enable the remote computing entity to determine one or more updates to be provided to the client device 101 via an upsert.

Moreover, as shown in FIG. 4, the fetch request may be transmitted to the remote computing entity from the client device 101 via a second communication connection, separate from the data connection (e.g., websocket connection) utilized to transmit data of object updates to the client device 101. However, it should be understood that in certain embodiments the fetch request may be transmitted via the websocket connection established between the remote computing platform and the client device 101.

The fetch request may cause the remote computing platform to initialize a query process to determine whether the object data stored at the client device matches the most-current object data stored at the remote computing platform for the object. For example, the remote computing platform may utilize a communication session identifier, if known to the remote computing platform; utilize time stamps indicative of the last update to the object data, and/or the like. Ultimately, the remote computing platform may be configured to transmit an upsert to the client device 101 regarding a particular object only upon determining that the client device's data store 451 does not include current object data for the particular object identified in the fetch request.

In other embodiments, the fetch request causes the remote computing entity to transmit an upsert relating to the identified object to the client device 101, regardless of whether the object data stored at the client device 101 for the object identified in the fetch request is current. This upsert is identified during normal monitoring by the manager 450 of the data store 451 as indicated at Blocks 503-504, and accordingly the upsert is processed according to various processes as described herein.

In the embodiment illustrated in FIG. 5, once the upsert requested by the fetch request is received at the client device 101 (as detected by the manager 450 during monitoring processes indicated at Blocks 503-504), the object is marked as fresh as indicated at Block 511 and the manager 450 continues monitoring for activity relating to the data store 451 as indicated at Blocks 503-504. It should be understood that if the object was marked as fresh prior to receipt of the upsert, the upsert relating to the fetch request is processed without interaction of the manager 450, and the upsert causes the object data stored in the data store 451 to be updated, and the manager 450 continues monitoring for additional activity relating to the data store 451 as indicated at Blocks 503-504.

Moreover, because the object was returned to the requesting app of the client device 101 in response to the get request prior to receiving the upsert with the updated data relating to the object, updated object data may be provided to the app during a subsequent get from the same app. In certain implementations, apps executing on a client device 101 generate gets for particular objects with a high degree of frequency (e.g., multiple times per second, multiple times per minute, and/or the like), and accordingly subsequent gets from the app will generally quickly update the object data utilized by the app after the upsert is accepted for the object into the data store 451.

In certain embodiments, upserts are automatically transmitted from the remote computing platform to the client device 101 shortly after becoming available (e.g., immediately upon generation of the object update at the remote computing platform). In other embodiments, upserts are not automatically transmitted from the remote computing platform to the client device 101 for objects stored within the local data store 451 until the occurrence of a trigger event. For example, while an object is marked as stale for a particular communication connection session, the remote computing platform may not transmit upserts for the object to the client device 101. Thus, immediately following initiation of a new communication connection session for a client device 101, the remote computing platform may not automatically transmit any object updates to the client device 101 via upserts. However, as objects are identified as fresh (e.g., as a result of gets and in accordance with the various steps discussed above), the remote computing platform subsequently transmits object updates periodically or in real-time to the client device 101 for those objects identified as fresh for the communication connection session.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. One or more non-transitory computer-readable media storing computer-executable instructions that, when executed by at least one processor, perform a method for managing a data store embodied within a memory storage area of a client device, comprising:
   establishing a connection session between the client device and a remote computing platform, wherein the remote computing platform comprises a plurality of group-based communication channels providing a communications environment to display a plurality of objects posted by channel members of each respective group-based communication channel;

wherein each object of the plurality of objects is associated with an indicator indicating whether a particular object is fresh or stale;

responsive to detecting establishment of the connection session, updating all fresh indicators to stale indicators;

receiving, at a client device data store in the client device, at least one instruction to perform one or more upserts for one or more objects of the plurality of objects associated with a particular group-based communication channel, wherein the one or more upserts are received from the remote computing platform, tracking fresh objects of the plurality of objects for a current connection session, wherein the fresh objects are identified as having been upserted during the current connection session; and responsive to detecting a get for the particular object of the plurality of objects:
  responsive to determining that that the particular object is not fresh, requesting an upsert from the remote computing platform to the client device data store for the particular object; and
  updating an indication that the particular object is fresh.

2. The non-transitory computer-readable media of claim 1, wherein each of the plurality of objects have a corresponding object identifier, and wherein tracking the fresh objects comprises:
  maintaining a session-specific indication of object identifiers corresponding with the fresh objects for the current connection session.

3. The non-transitory computer-readable media of claim 2, wherein the particular object has a corresponding particular object identifier; and wherein determining whether the particular object is a fresh object comprises:
  comparing the corresponding particular object identifier with the particular object against the session-specific indication of the object identifiers corresponding with the fresh objects for the current connection session.

4. The non-transitory computer-readable media of claim 1, wherein tracking the fresh objects comprises:
  tagging one or more identified objects of the plurality of objects with a connection session identifier indicative of an identified connection session during which a most recent upsert was received for a corresponding object of the one or more identified objects,
  wherein the fresh objects are tagged with a current connection session identifier matching a current session identifier corresponding with the current connection session.

5. The non-transitory computer-readable media of claim 1, wherein tracking the fresh objects comprises updating a binary freshness indicator associated with one or more updated objects to reflect a fresh state.

6. The non-transitory computer-readable media of claim 4, wherein the method further comprises:
  prior to determining whether the particular object is a fresh object, accessing the particular object by one or more local processing instances.

7. The non-transitory computer-readable media of claim 1, wherein any object updated with a fresh indicator during the connection session maintains the fresh indicator after termination of the connection session and until an initiation of a subsequent connection session.

8. A method for managing a data store embodied within a memory storage area of a client device, the method comprising:
  establishing a connection session between the client device and a remote computing platform, wherein the remote computing platform comprises a plurality of group-based communication channels providing a communications environment to display a plurality of objects posted by channel members of each respective group-based communication channel;
  wherein each object of the plurality of objects is associated with an indicator indicating whether a particular object is fresh or stale;
  responsive to detecting establishment of the connection session, updating all fresh indicators to stale indicators;
  receiving, at a client device data store in the client device, at least one instruction to perform one or more upserts for one or more objects of the plurality of objects associated with a particular group-based communication channel, wherein the one or more upserts are received from the remote computing platform,
  tracking fresh objects of the plurality of objects for a current connection session, wherein the fresh objects are identified as having been upserted during the current connection session; and
  responsive to detecting a get for the particular object of the plurality of objects:
    responsive to determining that that the particular object is not a fresh object, requesting an upsert from the remote computing platform to the client device data store for the particular object; and
  updating an indication that the particular object is fresh.

9. The method of claim 8, wherein each of the plurality of objects have a corresponding object identifier, and wherein tracking the fresh objects comprises:
  maintaining a session-specific indication of object identifiers corresponding with the fresh objects for the current connection session.

10. The method of claim 9, wherein the particular object has a corresponding particular object identifier; and wherein determining whether the particular object is fresh comprises:
  comparing the corresponding particular object identifier with the particular object against the session-specific indication of the object identifiers corresponding with the fresh objects for the current connection session.

11. The method of claim 10, wherein tracking the fresh objects comprises:
  tagging one or more identified objects of the plurality of objects with a connection session identifier indicative of an identified connection session during which a most recent upsert was received for a corresponding object of the one or more identified objects,
  wherein the fresh objects are tagged with a current connection session identifier matching a current session identifier corresponding with the current connection session.

12. The method of claim 10, wherein tracking the fresh objects comprises updating a binary freshness indicator associated with one or more updated objects to reflect a fresh state.

13. The method of claim 10 further comprising:
  prior to determining whether the particular object is fresh, accessing the particular object by one or more local processing instances.

14. The method of claim 8, wherein any object updated with a fresh indicator during the connection session maintains the fresh indicator after termination of the connection session and until an initiation of a subsequent connection session.

15. A system for managing a data store embodied within a memory storage area of a client device, the system comprising:
- a group-based communication system server of a group-based communication system;
- an external server communicatively coupled to the group-based communication system server;
- a group-based communication system client device associated with an initiating user; and
- a plurality of participant group-based communication system client devices associated with a respective plurality of members of a channel of the group-based communication system,
- wherein the group-based communication system client device associated with the initiating user is programmed to:
  - establish a connection session between the client device and a remote computing platform, wherein the remote computing platform comprises a plurality of group-based communication channels providing a communications environment to display a plurality of objects posted by channel members of each respective group-based communication channel;
  - wherein each object of the plurality of objects is associated with an indicator indicating whether a particular object is fresh or stale;
  - responsive to detecting establishment of the connection session, updating all fresh indicators to stale indicators;
  - receive, at a client device data store in the client device, at least one instruction to perform one or more upserts for one or more objects of a further plurality of objects associated with a particular group-based communication channel, wherein the one or more upserts are received from the group-based communication system;
  - track fresh objects of the plurality of objects for a current connection session, wherein the fresh objects are identified as having been upserted during the current connection session; and
  - upon detecting a get for the particular object of the plurality of objects:
    - responsive to determining that that the particular object is not a fresh object, request an upsert from the group-based communication system to the client device data store for the particular object; and
    - update an indication that the particular object is fresh.

16. The system of claim 15, wherein each of the plurality of objects have a corresponding object identifier, and wherein tracking the fresh objects comprises:
- maintaining a session-specific indication of object identifiers corresponding with the fresh objects for the current connection session.

17. The system of claim 16, wherein the particular object has a corresponding particular object identifier; and wherein determining whether the particular object is fresh comprises:
- comparing the corresponding particular object identifier with the particular object against the session-specific indication of the object identifiers corresponding with the fresh objects for the current connection session.

18. The system of claim 17, wherein tracking the fresh objects comprises:
- tagging one or more identified objects of the plurality of objects with a connection session identifier indicative of an identified connection session during which a most recent upsert was received for a corresponding object of the one or more identified objects,
- wherein the fresh objects are tagged with a current connection session identifier matching a current session identifier corresponding with the current connection session.

19. The system of claim 16, wherein tracking the fresh objects comprises updating a binary freshness indicator associated with one or more updated objects to reflect a fresh state.

20. The system of claim 15, wherein any object updated with a fresh indicator during the connection session maintains the fresh indicator after termination of the connection session and until an initiation of a subsequent connection session.

* * * * *